(12) United States Patent
Davies

(10) Patent No.: US 8,239,382 B2
(45) Date of Patent: Aug. 7, 2012

(54) METHOD AND APPARATUS FOR CREATING AN INDEX OF NETWORK DATA FOR A SET OF MESSAGES

(75) Inventor: Stephen A. Davies, Booterstown (IE)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 12/144,785

(22) Filed: Jun. 24, 2008

(65) Prior Publication Data

US 2009/0019021 A1    Jan. 15, 2009

(30) Foreign Application Priority Data

Jul. 12, 2007  (EP) .................................... 07112318

(51) Int. Cl.
*G06F 17/30* (2006.01)

(52) U.S. Cl. .................... 707/730; 707/742; 707/750

(58) Field of Classification Search .................. 707/730, 707/750, 912, 724, 742–744, 917
See application file for complete search history.

(56) References Cited

U.S. PATENT DOCUMENTS

| | | | | | |
|---|---|---|---|---|---|
| 5,832,502 | A | * | 11/1998 | Durham et al. | 1/1 |
| 6,026,398 | A | * | 2/2000 | Brown et al. | 707/745 |
| 6,163,782 | A | * | 12/2000 | Singhal | 1/1 |
| 7,734,614 | B2 | * | 6/2010 | Aoki et al. | 707/711 |
| 2003/0126561 | A1 | * | 7/2003 | Woehler et al. | 715/531 |
| 2005/0222985 | A1 | * | 10/2005 | Buchheit et al. | 707/3 |
| 2006/0053204 | A1 | * | 3/2006 | Sundararajan et al. | 709/206 |
| 2006/0167864 | A1 | * | 7/2006 | Bailey et al. | 707/3 |
| 2006/0173957 | A1 | * | 8/2006 | Robinson et al. | 709/204 |

* cited by examiner

*Primary Examiner* — Shahid Alam
*Assistant Examiner* — James E. Richardson
(74) *Attorney, Agent, or Firm* — Hoffman Warnick LLC; Daniel McLoughlin

(57) ABSTRACT

A method for creating an index of network data for a set of message data, the index being arranged for searching the set of message data. A method in accordance with an embodiment of the invention includes: creating a set of dialogue records, where each the dialogue record is the set of messages corresponding to a dialogue between a sender and recipient pair in a message corpus; —logging each of the set of messages in each corresponding dialogue record; and creating an index of terms from the set of messages, the index being arranged to index each term to each dialogue record in which the message comprising the respective term is logged.

13 Claims, 6 Drawing Sheets

```
Index of Terms by Dialogue Records t1: A-B/5, B-A/5, B-C/6, C-B/1, A-C/23, C-A/0;
t2: A-B/0, ...
t3: A-B/1, ...
...
tn: A-B/7, ...
```

207

METHOD AND APPARATUS FOR CREATING AN INDEX OF NETWORK DATA FOR A SET OF MESSAGES

FIELD OF INVENTION

The present invention relates to a method and apparatus for creating an index of network data for a set of messages.

RELATED ART

Many computerized searching systems use indexes to speed up a search for a given search term in a given search space. Such indexes comprise precompiled lists of possible search terms from the search space and index each such term to the documents or other sources from which the search terms originate. Indexes can be created using specialized indexing application programs.

In some situations, a user may wish to search for a first search term and then perform additional steps to consolidate a set of search results. Such two-step searches can be performed easily on structured data such as data base records. However, when the data is unstructured or badly structured, for example plain text message archives, then such searching is often slow or requires large amounts of processing power.

SUMMARY OF THE INVENTION

An embodiment of the invention provides a method for creating an index of network data for a set of message data, the index being arranged for searching the set of message data, the method comprising: creating a set of dialogue records, where each dialogue record comprises a set of messages corresponding to a dialogue between a sender and recipient pair in a message corpus; logging each message of the set of messages in each corresponding dialogue record; and creating an index of terms from the set of messages, the index being arranged to index each term to each dialogue record in which the message comprising the respective term is logged.

The method may further comprise: performing a search for a search term in the set of message data using the index; and compiling a set of selected dialogue records from the index, each selected dialogue record logging one or more messages comprising the search term. The index may further comprise a weighting for each occurrence of a given dialogue record, the weighting being determined by the number of messages logged in the respective dialogue record comprising the respective term. The index may further comprise a weighting for each occurrence of a given dialogue record, the weighting being determined by a frequency of the respective search term in messages logged in the respective dialogue record. A threshold may be provided for the weighting and only dialogue records having a weighting above the threshold are included in the index. The messages logged in each selected dialogue record may be collated for display. The index may be provided for identifying a message network structure from the message data.

Another embodiment provides an apparatus for creating an index of network data for a set of message data, the index being arranged for searching the set of message data, the apparatus being operable for: creating a set of dialogue records, where each dialogue record is a set of messages corresponding to a dialogue between a sender and recipient pair in a message corpus; logging each message of the set of messages in the corresponding dialogue record; and creating an index of terms from the set of messages, the index being arranged to index each term to the dialogue record in which the message comprising the respective term is logged.

A further embodiment provides a group of one or more programs arranged to enable a group of one or more programmable devices to perform a method for creating an index of network data for a set of message data, the index being arranged for searching the set of message data, the method comprising: creating a set of dialogue records, where each dialogue record is a set of messages corresponding to a dialogue between a sender and recipient pair in a message corpus; logging each of the set of messages in each corresponding dialogue record; and creating an index of terms from the set of messages, the index being arranged to index each term to each dialogue record in which the message comprising the respective term is logged.

Another embodiment provides a group of one or more programs arranged to enable a group of one or more programmable devices to provide apparatus for creating an index of network data for a set of message data, the index being arranged for searching the set of message data, the apparatus being operable for: creating a set of dialogue records, where each dialogue record is a set of messages corresponding to a dialogue between a sender and recipient pair in a message corpus; logging each of the set of messages in each corresponding dialogue record; and creating an index of terms from the set of messages, the index being arranged to index each term to each dialogue record in which the message comprising the respective term is logged.

BRIEF DESCRIPTION OF THE DRAWINGS

Embodiments of the invention will now be described, by way of example only, with reference to the accompanying drawings.

DETAILED DESCRIPTION OF THE INVENTION

Figure 1:
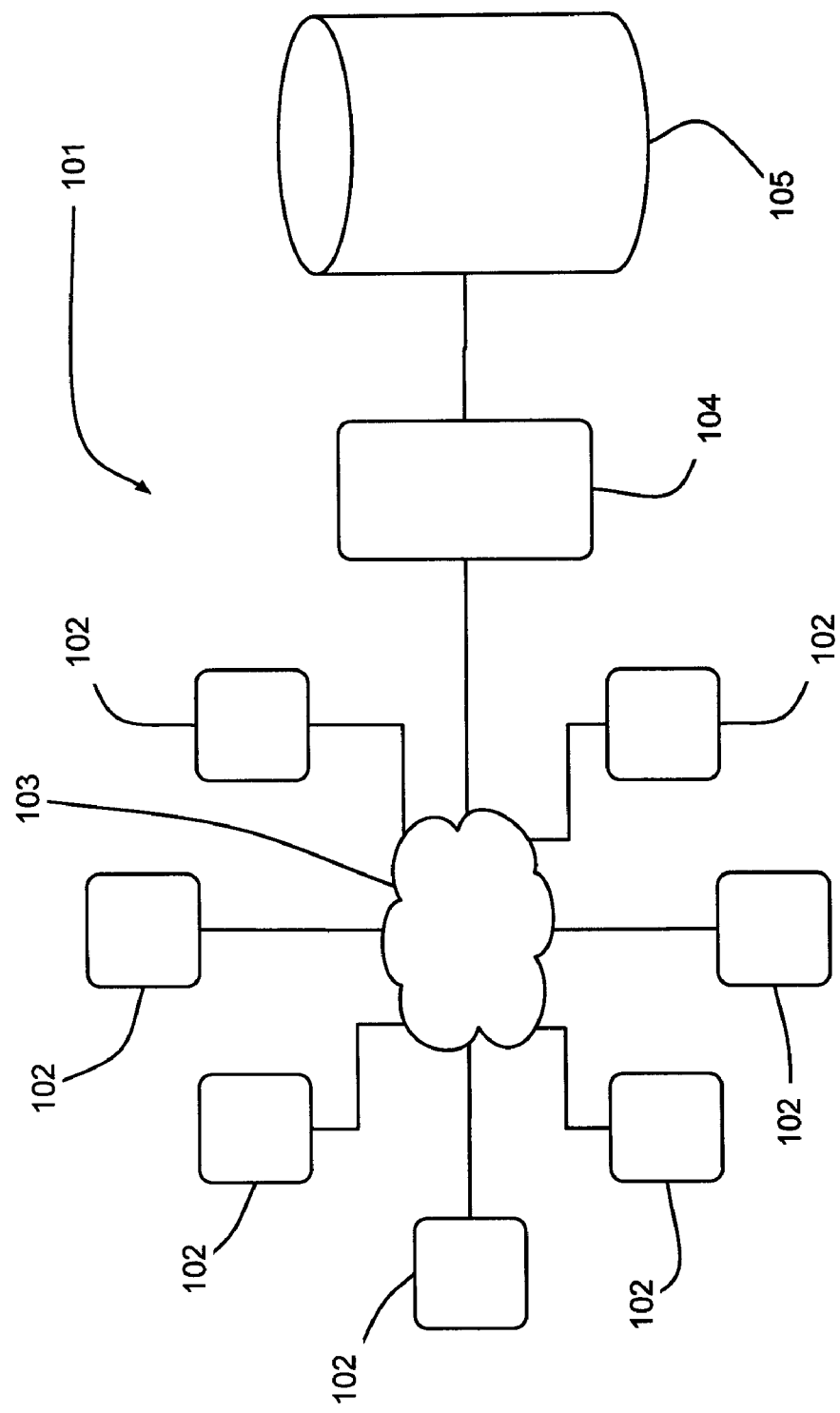
FIG. 1 is a schematic illustration of a computer system comprising a messaging system in accordance with an embodiment of the present invention.

With reference to FIG. 1, a computer system 101 comprises a set of client computers 102 interconnected via a network 103 in the form of an intranet. A server computer 104 is also connected to the network 103 and to a storage device 105 in the form of a disk drive. The client computers 102 each provide messaging services to their respective users via client messaging application programs. Each client computer 102 is also provided with a web browser application program. The server computer 104 manages the messaging system via an email server application program (shown later).

Figure 2:
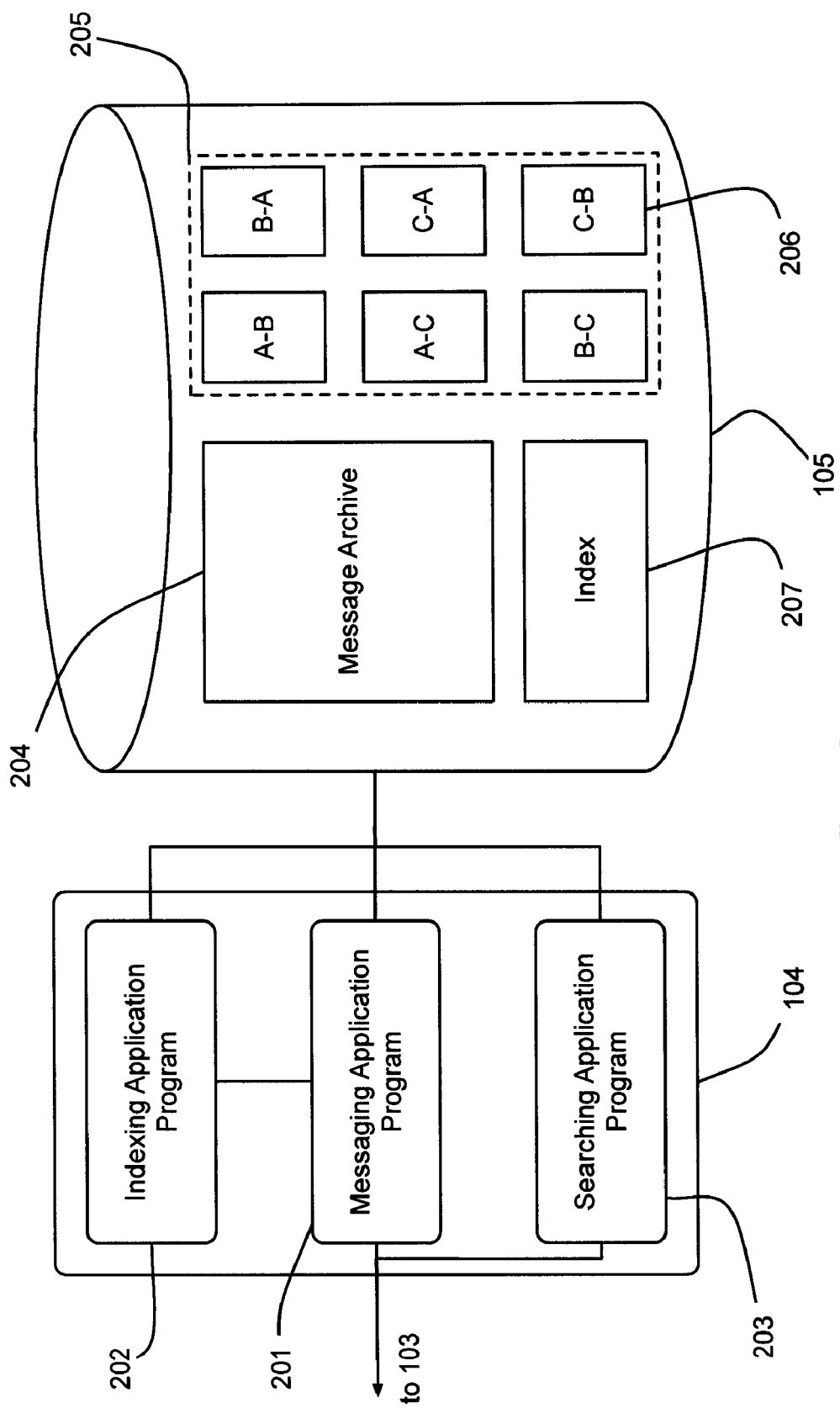
FIG. 2 is a schematic illustration of a server computer in the computer system of FIG. 1 in accordance with an embodiment of the present invention.

With reference to FIG. 2, the server computer 104 runs three application programs in the form of a messaging server application program 201, an indexing application program 202, and a searching application program 203. The messaging server application program 201 is arranged to provide a messaging hub that receives and forwards messages between the messaging client application programs. The message server application program 201 keeps a message archive 204, which holds a copy of every message sent between the respective client message application programs. In addition to the message archive 204 the message server application program 201 is also arranged to extract and store meta data 205 relating to the messages in the message archive 204 in the form of set of dialogue records 206.

The meta data 205 represented by each dialogue record 206 comprises a record of each sender and recipient pair and is extracted from each of the messages in the message archive 204. In the present embodiment, each dialogue record 206 represents a directional link between users. In other words, a dialogue record 206 is created when a given user is a message sender and a further dialogue record 206 is created when the given user is a message recipient. FIG. 2 illustrates the dialogue records 206 for three users (A, B, C) which comprises six dialogue records 206 since each user has acted as both sender and recipient for each of the other users in the messages in the message archive 204. The dialogue records 206 represent the network of communications formed by the messages in the message archive or corpus 204.

The indexing application program 202 is arranged to create an index 207 of the dialogue records 206 by the search terms in the form of the text contained in the messages in the message archive 204. In other words, each search term in the index 207 indicates which of the dialogue records 206 relates to messages comprising the given search term. The index 207 and the processing performed by the indexing application program 202 will be described in further detail below.

The searching application program 203 is arranged to enable users or administrators to search the message archive 204 using a set of one or more search terms. The searching application program 203 is accessed via a web page and uses the index 207 to perform the search. Thus, in response to a search request on one or more search terms, the searching application program 203 is arranged to return the set of references to dialogue records 206 that relate to the messages that comprise the relevant search terms in accordance with the index 207. The processing performed by the searching application program 203 will be described in further detail below.

Figure 3:
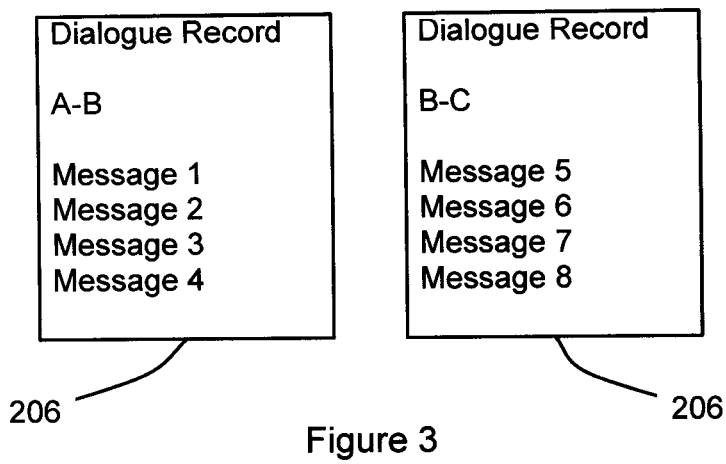
FIGS. 3, 4, and 5 are tables illustrating data created in the server computer of FIG. 2 in accordance with an embodiment of the invention.

An example of the dialogue records 206 is shown in FIG. 3. Each dialogue record 206 comprises a unique identifier representing the pairing of the sender's and recipient's message addresses for the messages logged in the given dialogue record 206. Each relevant message is logged in the dialogue record 206 via a reference or pointer to the relevant message in the message archive 204. For example, the first dialogue record 206 in FIG. 3 represents the message dialogue between user A as sender and user B as recipient and refers to four messages (messages 1 to 4), which have been sent by user A to user B. The second dialogue record 206 represents the message dialogue between user B as sender and user C as recipient and refers to four messages (messages 5 to 8), which have been sent by user B to user C. In the case where there are multiple recipients for a given message, the message will appear in all the relevant dialogue records 206.

Figure 4:
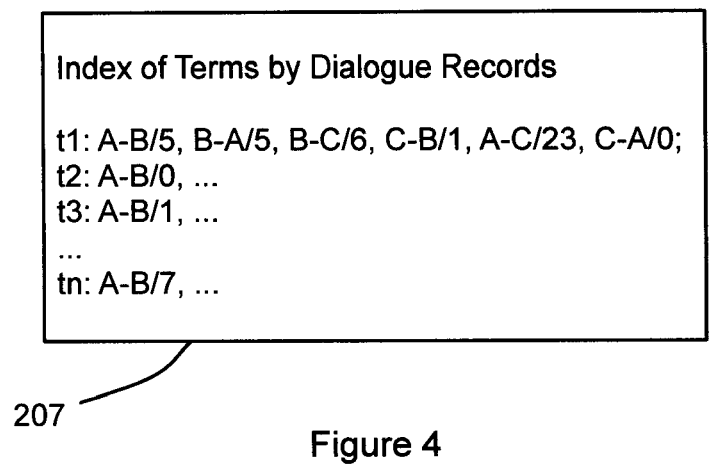

An example of the index 207 is shown in FIG. 4, which lists the possible search terms (t1 to tn) in the messages referred to in the set of dialogue records 206. For each search term t, the index 207 comprises a reference to each dialogue record 206 that logs messages comprising the term, along with a message number denoting the number of the relevant messages. For example, the term t1 is contained in five messages sent from user A to user B, five messages sent from user B to user A, six messages sent from user B to user C, one message sent from user C to B, twenty three messages sent from user A to user C and none of the messages sent from user C to user A.

Figure 5:
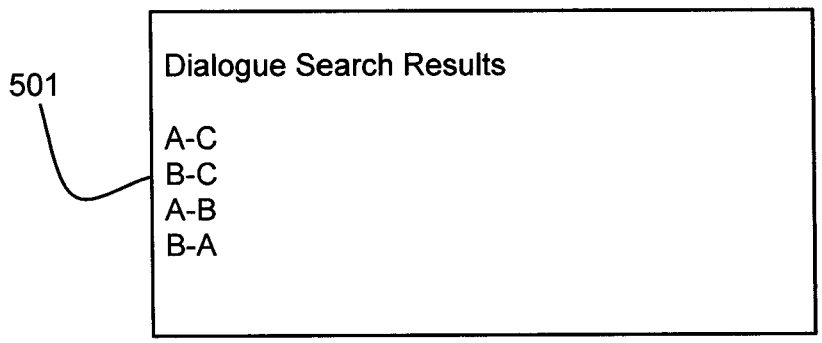

An example of the results returned by the searching application program 203 is shown in FIG. 5. Using the index 207 and performing a search for the search term t1 on the dialogue records 206, the searching application program 203 returns a subset of the highest ranking dialogue records that meet a preset message number threshold. In the present embodiment, the searching application program 203 has a message number threshold set at 4. Only dialogue records in the index 207 with a message number over the message number threshold are included in the search results 501. The returned dialogue records are ordered by the number of messages in each dialogue record that refer to the search term as indicated in the index 207, that is, the message number. Thus, as shown in FIG. 5, the search results 501 for the term t1 rank the dialogue record from user A to user C first followed by those from user B to user C, user A to B and user B to user A.

Figure 6:
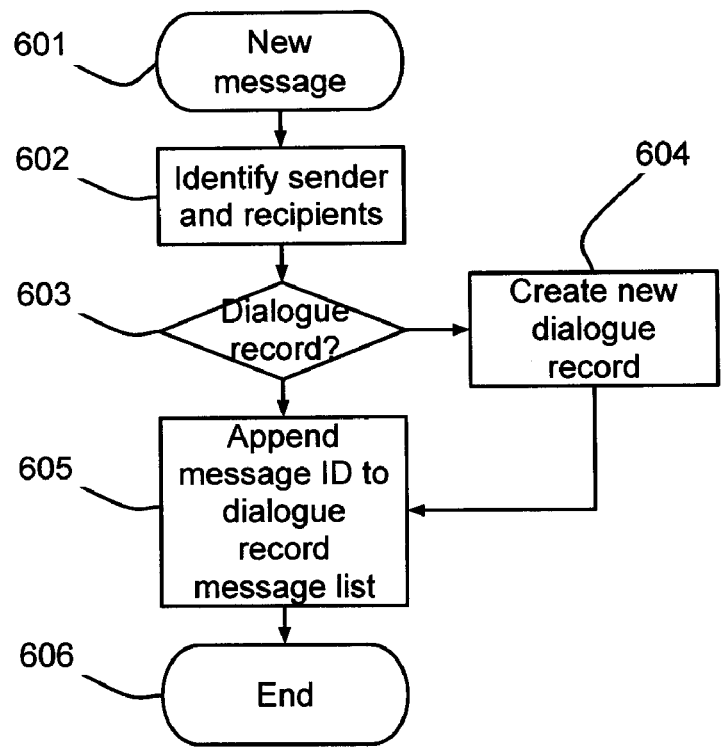
FIGS. 6, 7 and 8 are flow charts illustrating processing performed by the server computer of FIG. 2 in accordance with an embodiment of the invention.

The processing performed by the messaging application program 201 when creating and updating the dialogue records will now be described further with reference to FIG. 6. The processing is performed by an additional subroutine that operates alongside a standard messaging system. Processing is initiated at step 601 in response to the receipt of a message from one of the client messaging application programs and processing moves to step 602. At step 602, the message is scanned to identify the sender and recipients and processing moves to step 603. At step 603, each sender/recipient pair is checked against any existing dialogue records 206. If any sender/recipient pair does not correspond to an existing dialogue record then processing moves to step 604 where an appropriate new dialogue record is created. Processing then moves to step 605. Also, at step 603 for each sender/recipient pair that corresponds to an existing dialogue record processing moves to step 605. At step 605, the unique message identifier, for identifying the message in the message archive, is appended to each dialogue record corresponding to each identified sender/recipient pair. The unique message identifier, in the form of a pointer, is arranged to enable the indexing application program to identify the relevant messages in the archive from the dialogue record and thus enable the search terms in the identified messages to be indexed by the corresponding dialogue record. Processing then ends at step 606.

Figure 7:
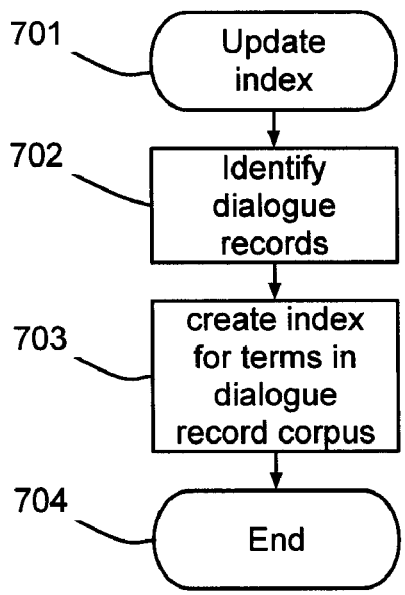

The processing performed by the indexing application program 202 when creating the index 207 will now be described further with reference to FIG. 7. At step 701, the processing of the indexing application program 202 is initiated either manually or in accordance with a predetermined trigger or schedule. Processing then moves to step 702 where the current set of dialogue records is identified and processing moves to step 703. At step 703, each search term in each message referenced in each of the dialogue records is indexed to the relevant dialogue record. In addition, the number of messages referenced in a given dialogue record that contain a given search term is logged as the message number in the index against the relevant dialogue record identifier for the given search term. Logging the number of messages provides the searching application program with the mechanism for ranking its search results as described above. Once the index 207 has been compiled, processing ends at step 704.

Figure 8:
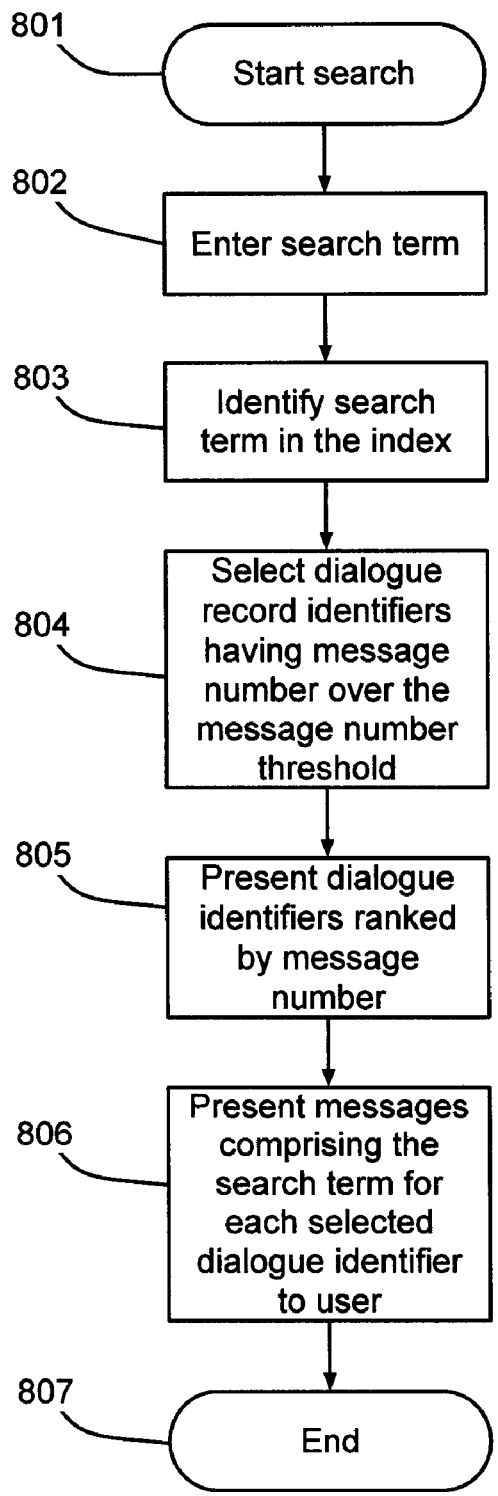

The processing performed by the searching application program 203 when performing a search for a given search term will now be described further with reference to FIG. 8. At step 801, the search application program is started and processing moves to step 802, where a search term is entered by user. Processing then moves to step 803 where the index 207 is identified and the search term is identified within the index 207. Processing then moves to step 804 where each of the entries in the index entry for the search term having a message number over the message number threshold are identified and collated in message number order. Processing then moves to step 805 where the dialogue record identifiers, ordered by message number, are presented to the user for selection. Processing then moves to step 806 where, in response to any user selection in step 805, the messages referenced in the selected dialogue are displayed to the user. Processing then ends at step 807.

Embodiments of the invention enable the searching of dialogues within a message corpus in a single search step. This enables information relating to the network or pattern of communications between users to be identified and analyzed. For example, searches may enable the most relevant parties to be identified on a particular subject defined by one or more search terms. Such a search may be used to identify a user who is an expert on a given subject or to identify a user or group of users who require further information or training on a given subject.

In a further embodiment, the search results of FIG. 5 are presented to the user in the form of a network diagram 901. The network diagram comprises a node 902, 903, 904 representing each of the parties A, B, C present in the search results 501. Each node 902, 903, 904 is connected by one or more directional arcs 905 to others of the nodes. The arcs 905 indicate that a message, containing the search term, has passed between those nodes in the direction indicated by the arc. Each arc 905 comprises a label indicating, in the present embodiment, the message number for the given communication. For example, the arc 905 from node 902 to node 904 indicates that twenty three messages containing the search term have been sent by user A to user C. Similarly, the arcs 905 between node 902 and node 903 indicate five messages containing the search term have passed each way between users A and B. Each node 902, 903, 904 is also labeled with a total number of the messages containing the search term that have been sent by the user represented by the given node. Thus, user A has sent a total of twenty eight messages containing the search term.

Analysis of the information comprising the network diagram 901 may enable the identification of an expert on a given search term. In the example in FIG. 9, the message pattern may indicate that user A is an expert on the subject defined by the search term. Alternatively, it may be the case that user A is sending messages requesting information of the given subject. As will be understood by those skilled in the art, it may also be informative to provide a measure of the messages received by a given user on a given subject or search term.

In another embodiment, the dialogue records comprise bi-direction sender/recipient pairing as opposed to unidirectional pairings as described above. The search results enable messaging groups for a given subject to be identified. In a further embodiment, the message number is substituted for a measure of the frequency of a given search term in the messages referenced in a given dialogue record. As will be understood by those skilled in the art, the threshold level for the message number or term frequency measures may be set at any suitable level depending on the given application. In another embodiment where multiple search terms are entered, the results are ranked based on an aggregation of the message numbers or term frequencies for each term.

In a further embodiment, the search results, in the form of the returned dialogue record identifiers are used to perform network or graph analysis on the messaging network. Such analysis may enable the identification of groups and associations within the network and may be used for the subsequent management of the network or its users. In a further embodiment, a page-ranking algorithm is used to rank the dialogue records so as to create a measure of the connectivity of each user, based on a single or combination of search terms, which may then be used to measure the user's importance or significance in the messaging network.

In another embodiment, the message number or term frequency threshold is defined as an expertise threshold, with the sender in a given dialogue record being deemed an expert for a given search term if the corresponding message number exceeds the given threshold. Separate weightings can be applied to messages to and from the user, and a combination of weightings for inputs and outputs to the user can be used to generate differing thresholds. As will be understood by those skilled in the art, different weightings can be given to different sections of a message, for example, the title can have a higher weighting than the main body text.

In a further embodiment, no message number threshold is provided, with all search results from the index being displayed for the user. In another embodiment, the threshold is used to filter the dialogue records that appear in the index. In other words, only dialogue records having a weighting, either in terms of term frequency or message number, or a combination of both, which exceeds the threshold are included in the index.

In another embodiment the references or pointers to a given message in a dialogue record are replaced with the text of each relevant message. In other words, the text of each relevant message is included in or appended to the dialogue record.

In a further embodiment, instead of rewriting the index each time it requires updating, the indexing application program is arranged to update the existing index. The updating procedure comprises the steps of: deleting the dialogue records relevant to each new or deleted message in the message corpus; reconstituting each removed dialogue record so as to add or remove each respective message or message reference; replacing the dialogue records; and updating the appropriate terms in the index for the added or deleted messages in the reconstituted dialogue records. In another embodiment, the updating procedure is arranged to update the existing dialogue records, each time a new message is added or removed, without the need for the deletion and reconstitution described above.

Figure 9:
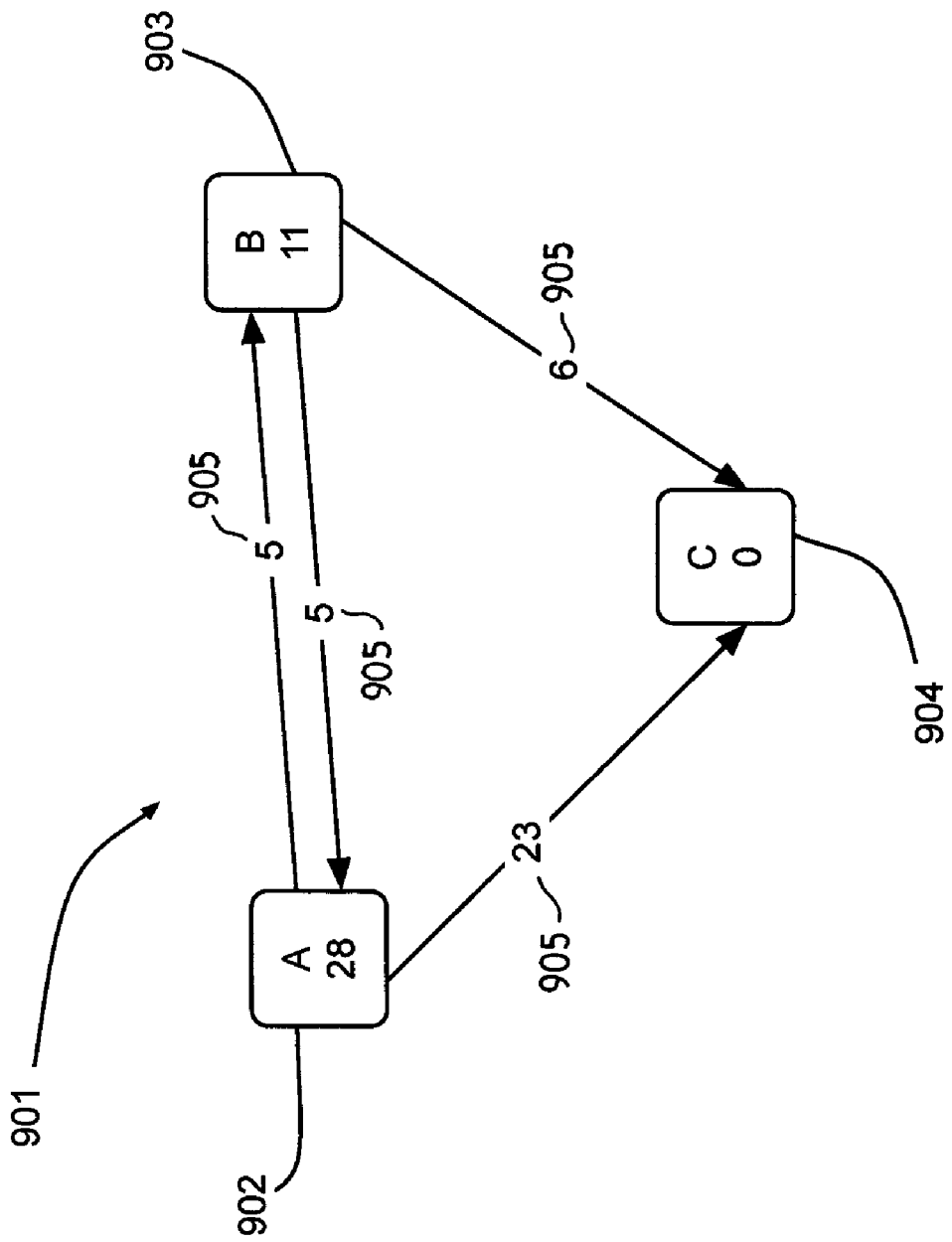
FIG. 9 is a network diagram for the results data of FIG. 5 in accordance with an embodiment of the present invention.

In another embodiment, the results of a search are presented to a user automatically in the form of a network diagram as shown in FIG. 9. In a further embodiment, the network diagram is presented to the user as an option or instead of the presentation of the results as shown in FIG. 5.

As will be understood by those skilled in the art, the indexing and searching application programs may be arranged as a single program. Similarly, the indexing messaging and searching application programs may be arranged as a single program or the functionality of one or more of them may be incorporated in some other application program or operating system.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described.

The invention claimed is:

1. A method of creating and utilizing an index of network data for a set of message data, the index being arranged for searching the set of message data, the method comprising:
    creating a set of dialogue records, where each dialogue record is the set of messages corresponding to a directional dialogue link between a sender and recipient pair in a message corpus,
        wherein a first dialogue record is created when the sender sends a first message, and a second dialogue record is created when the sender of the first message receives a second message;
    logging each of the set of messages in each corresponding dialogue record;
    creating an index of terms from the set of messages, the index being arranged to indicate, for each term, at least one dialogue record in which the message comprising the respective term is logged, wherein creating the index further comprises weighting each occurrence of a given dialogue record, the weighting being determined using a count of the number of the messages logged in the respective dialogue record comprising the respective term;
    performing a search for a search term in the set of message data using the index;
    compiling a set of selected dialogue records from the index, each selected dialogue record logging one or more messages comprising the search term; and
    displaying the messages logged in each selected dialogue record in order by the weighting.

2. The method according to claim 1, further comprising:
    providing a threshold associated with the weighting and only dialogue records having a weighting above the threshold are included in the index.

3. The method according to claim 1, wherein the index further comprises a weighting for each occurrence of a given dialogue record, the weighting being determined by a frequency of the respective term in the messages logged in the respective dialogue record.

4. The method according to claim 3, further comprising:
    providing a threshold associated with the weighting and only dialogue records having a weighting above the threshold are included in the index.

5. The method according to claim 1, wherein the index is provided for identifying a message network structure from the message data.

6. The method of claim 1, wherein the displaying further comprises displaying the collated messages logged in each selected dialogue record in a network diagram, wherein the network diagram includes a node representing each sender and each recipient.

7. A computing device for creating and utilizing an index of network data for a set of message data, the index being arranged for searching the set of message data, the computing device comprising: at least one computer including a storage device, including:
    a system for creating a set of dialogue records stored on the storage device, where each dialogue record is the set of messages corresponding to a directional dialogue link between a sender and recipient pair in a message corpus, wherein a first dialogue record is created when the sender sends a first message, and a second dialogue record is created when the sender of the first message receives a second message;
    a system for logging each of the set of messages in each corresponding dialogue record;
    a system for creating an index of terms from the set of messages, the index being arranged to indicate, for each term, at least one dialogue record in which the message comprising the respective term is logged, wherein creating the index further comprises weighting each occurrence of a given dialogue record, the weighting being determined using a count of the number of the messages logged in the respective dialogue record comprising the respective term;
    a system for performing a search for a search term in the set of message data using the index;
    a system for compiling a set of selected dialogue records from the index, each selected dialogue record logging one or more messages comprising the search term; and
    a system for displaying the messages logged in each selected dialogue record in order by the weighting.

8. The apparatus according to claim 7, wherein a threshold is provided for the weighting and only dialogue records having a weighting above the threshold are included in the index.

9. The apparatus according to claim 7, wherein the index further comprises a weighting for each occurrence of a given dialogue record, the weighting being determined by a frequency of the respective search term in the messages logged in the respective dialogue record.

10. The apparatus according to claim 9, wherein a threshold is provided for the weighting and only dialogue records having a weighting above the threshold are included in the index.

11. The apparatus according to claim 7, wherein the index is provided for identifying a message network structure from the message data.

12. The apparatus of claim 7, wherein the collated messages logged in each selected dialogue record are displayed in a network diagram, wherein the network diagram includes a node representing each sender and each recipient.

13. A storage device operably connected to a computing device, the storage device storing software thereon which when executed, causes the computing device to perform:
    creating a set of dialogue records, where each dialogue record is the set of messages corresponding to a directional dialogue link between a sender and recipient pair in a message corpus, wherein a first dialogue record is created when the sender sends a first message, and a second dialogue record is created when the sender of the first message receives a second message;
    logging each of the set of messages in each corresponding dialogue record;
    creating an index of terms from the set of messages, the index being arranged to indicate, for each term, at least one dialogue record in which the message comprising the respective term is logged, wherein creating the index further comprises weighting each occurrence of a given dialogue record, the weighting being determined using a count of the number of the messages logged in the respective dialogue record comprising the respective term;

performing a search for a search term in the set of message data using the index;

compiling a set of selected dialogue records from the index, each selected dialogue record logging one or more messages comprising the search term; and displaying the messages logged in each selected dialogue record in order by the weighting.

* * * * *